(12) United States Patent
Hill et al.

(10) Patent No.: US 9,262,185 B2
(45) Date of Patent: Feb. 16, 2016

(54) SCRIPTED DYNAMIC DOCUMENT GENERATION USING DYNAMIC DOCUMENT TEMPLATE SCRIPTS

(75) Inventors: Michael J. Hill, Vadnais Heights, MN (US); John C. Horton, Saint Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 335 days.

(21) Appl. No.: 12/951,238

(22) Filed: Nov. 22, 2010

(65) Prior Publication Data

US 2012/0131439 A1 May 24, 2012

(51) Int. Cl.
*G06F 17/00* (2006.01)
*G06F 9/455* (2006.01)
*G06F 17/21* (2006.01)
*G06F 17/22* (2006.01)

(52) U.S. Cl.
CPC .......... *G06F 9/45512* (2013.01); *G06F 17/211* (2013.01); *G06F 17/2247* (2013.01)

(58) Field of Classification Search
CPC ............................ G06F 17/211; G06F 17/2247
USPC .................................................. 715/234, 235
See application file for complete search history.

(56) References Cited

U.S. PATENT DOCUMENTS

| | | | | |
|---|---|---|---|---|
| 6,263,352 B1 * | 7/2001 | Cohen | ........................... | 715/206 |
| 6,311,058 B1 * | 10/2001 | Wecker | ................. | G06F 17/211 455/412.1 |
| 6,449,638 B1 * | 9/2002 | Wecker | ................. | G06F 1/3209 709/217 |
| 7,181,734 B2 * | 2/2007 | Swamy | ................ | G06F 17/2247 707/999.101 |
| 7,313,757 B2 * | 12/2007 | Bradley | ................. | G06F 17/243 715/222 |
| 7,555,707 B1 * | 6/2009 | Labarge | ............... | G06F 17/2247 715/234 |
| 7,725,923 B2 * | 5/2010 | Miyashita et al. | ................. | 726/1 |
| 7,925,966 B2 * | 4/2011 | Kaler et al. | .................... | 715/200 |
| 8,402,357 B1 * | 3/2013 | Norwood | ............ | G06F 17/2247 715/202 |
| 8,413,047 B2 * | 4/2013 | Vick et al. | ...................... | 715/237 |
| 8,434,000 B2 * | 4/2013 | Cantwell et al. | ............... | 715/234 |
| 8,799,515 B1 * | 8/2014 | Wu | ..................... | H04L 67/2814 709/219 |
| 2001/0051961 A1 * | 12/2001 | Duxbury | ....................... | 707/517 |
| 2005/0066273 A1 * | 3/2005 | Zacky | ................. | G06F 17/2247 715/249 |
| 2005/0125720 A1 * | 6/2005 | Little et al. | ..................... | 715/513 |
| 2005/0251742 A1 * | 11/2005 | Mogilevsky | .......... | G06F 17/212 715/236 |
| 2006/0059169 A1 * | 3/2006 | Armishev | ........... | G06F 17/2247 |
| 2006/0095835 A1 * | 5/2006 | Kennedy | ............... | G06F 17/211 715/234 |
| 2006/0156224 A1 * | 7/2006 | Sulistio et al. | ................ | 715/513 |
| 2006/0242563 A1 * | 10/2006 | Liu et al. | ....................... | 715/513 |
| 2006/0294451 A1 * | 12/2006 | Kelkar | ................ | G06F 17/2247 715/235 |

(Continued)

*Primary Examiner* — Mohammed-Ibrahim Zuberi
(74) *Attorney, Agent, or Firm* — Richard J. Gregson

(57) ABSTRACT

A dynamic document template having static data, dynamic data, and/or procedural statements may be called by an application on a server. The dynamic document template is separate from the application program and is processed to form an interim script, which is then executed by a host computer system. The script generates document records in HTML or XML format that are output to a document. The data and procedural statements in the dynamic document template may be distinguished through interpreting mark-up language surrounding the data and procedural statements. The dynamic document templates execute in a separate namespace from the application and preserve the state of data in the application. A given application may call more than one dynamic document template to generate different portions of the output document. Additionally, the dynamic document templates may be replaced with new templates without affecting the application.

18 Claims, 5 Drawing Sheets

(56) References Cited

U.S. PATENT DOCUMENTS

| | | | |
|---|---|---|---|
| 2007/0028166 A1* | 2/2007 | Hundhausen | G06F 17/212 715/205 |
| 2007/0162470 A1* | 7/2007 | Chang | G06F 17/227 |
| 2007/0174814 A1* | 7/2007 | Komissarchik | G06F 8/71 717/115 |
| 2007/0245232 A1* | 10/2007 | Wake | G06F 17/212 715/234 |
| 2007/0258100 A1* | 11/2007 | Kano | G06F 17/21 358/1.5 |
| 2007/0273936 A1* | 11/2007 | Fujimaki | G06F 17/2247 358/474 |
| 2007/0277095 A1* | 11/2007 | Ukigawa | G06F 17/2247 715/255 |
| 2007/0283246 A1* | 12/2007 | Wake | G06F 17/2229 715/234 |
| 2008/0005085 A1* | 1/2008 | Fujimaki | G06F 17/212 |
| 2008/0005136 A1* | 1/2008 | Kano | G06F 17/248 |
| 2008/0005659 A1* | 1/2008 | Fujimaki | G06F 17/2211 715/234 |
| 2008/0005662 A1* | 1/2008 | Kano | G06F 17/2247 715/234 |
| 2008/0010587 A1* | 1/2008 | Wake | G06F 17/2247 715/234 |
| 2008/0010588 A1* | 1/2008 | Wake | G06F 17/2247 715/234 |
| 2008/0040588 A1* | 2/2008 | Ukigawa | G06F 17/24 712/228 |
| 2008/0065979 A1* | 3/2008 | Fujimaki | G06F 17/241 715/230 |
| 2008/0133563 A1* | 6/2008 | Hironiwa | G06F 8/51 |
| 2008/0134019 A1* | 6/2008 | Wake | G06F 17/227 715/239 |
| 2008/0195626 A1* | 8/2008 | Ukigawa | G06F 17/2247 |
| 2008/0195950 A1* | 8/2008 | Fujimaki | G06F 17/2241 715/734 |
| 2008/0208790 A1* | 8/2008 | Oshima | G06F 17/241 |
| 2008/0209572 A1* | 8/2008 | Kano | G06F 17/2205 726/28 |
| 2008/0250310 A1* | 10/2008 | Chen | G06F 17/2247 715/234 |
| 2008/0250311 A1* | 10/2008 | Mitsufuji | G06F 17/2247 715/273 |
| 2008/0262832 A1* | 10/2008 | Kano | G06F 17/2247 704/10 |
| 2008/0262833 A1* | 10/2008 | Kano | G06F 17/2247 704/10 |
| 2008/0263101 A1* | 10/2008 | Hara | G06F 17/2247 |
| 2008/0285064 A1* | 11/2008 | Ukigawa | G06F 17/212 358/1.13 |
| 2008/0320412 A1* | 12/2008 | Wake | G06F 3/0486 715/781 |
| 2009/0019064 A1* | 1/2009 | Takafuji | G06F 17/30705 |
| 2009/0021767 A1* | 1/2009 | Fujimaki | G06F 17/24 358/1.15 |
| 2009/0070295 A1* | 3/2009 | Otomori | G06F 17/2247 |
| 2009/0077369 A1* | 3/2009 | Fujimaki | G06F 17/2247 713/100 |
| 2009/0077462 A1* | 3/2009 | Kano | G06F 17/227 715/234 |
| 2009/0083300 A1* | 3/2009 | Wake | G06F 17/248 |
| 2009/0083617 A1* | 3/2009 | Hironiwa | G06F 17/243 715/222 |
| 2009/0083620 A1* | 3/2009 | Fujimaki | G06F 17/2247 715/255 |
| 2009/0132906 A1* | 5/2009 | Aoki | G06F 3/0481 715/234 |
| 2009/0137202 A1* | 5/2009 | Fujimaki | G06F 17/2247 455/3.01 |
| 2009/0144753 A1* | 6/2009 | Morris | G06F 17/2247 719/318 |
| 2009/0235156 A1* | 9/2009 | Wake | G06F 17/24 715/234 |
| 2009/0254803 A1* | 10/2009 | Bayne | 715/222 |
| 2009/0282333 A1* | 11/2009 | Olsen | G06F 9/4448 715/703 |
| 2009/0282349 A1* | 11/2009 | Olsen | G06F 9/4443 715/760 |
| 2010/0036860 A1* | 2/2010 | Hiura | G06F 17/2247 707/634 |
| 2010/0077295 A1* | 3/2010 | Ichino | G06F 17/2247 715/235 |
| 2010/0115394 A1* | 5/2010 | Oshima | G06F 17/248 715/234 |
| 2010/0115395 A1* | 5/2010 | Matsumoto | G06F 17/24 715/234 |
| 2010/0199167 A1* | 8/2010 | Uematsu | G06F 17/24 715/234 |
| 2011/0161840 A1* | 6/2011 | Wong et al. | 715/760 |
| 2011/0209047 A1* | 8/2011 | Olsen | G06F 9/4448 715/234 |
| 2012/0054595 A1* | 3/2012 | Mylroie | G06F 17/2247 715/234 |
| 2013/0191723 A1* | 7/2013 | Pappas | G06F 17/30917 715/234 |
| 2013/0311875 A1* | 11/2013 | Pappas | G06F 17/2247 715/234 |
| 2013/0339841 A1* | 12/2013 | Petti | G06F 17/2247 715/234 |
| 2014/0047322 A1* | 2/2014 | Kim | G06F 17/2247 715/234 |
| 2014/0053053 A1* | 2/2014 | Hogue | G06F 17/2247 715/234 |
| 2014/0089782 A1* | 3/2014 | Cook | G06Q 30/0241 715/234 |
| 2014/0101287 A1* | 4/2014 | Wu | G06F 17/2247 709/217 |
| 2014/0129924 A1* | 5/2014 | Le Bescond de Coatpont | G06F 17/2247 715/234 |
| 2014/0237352 A1* | 8/2014 | Sriganesh | G06F 17/30876 715/234 |
| 2014/0282125 A1* | 9/2014 | Duneau | G06F 3/0481 715/762 |
| 2014/0310591 A1* | 10/2014 | Nguyen | G06F 17/2247 715/234 |
| 2015/0169533 A1* | 6/2015 | Michael | G06F 17/248 715/235 |

* cited by examiner

SCRIPTED DYNAMIC DOCUMENT GENERATION USING DYNAMIC DOCUMENT TEMPLATE SCRIPTS

TECHNICAL FIELD

The instant disclosure relates to computer programs. More specifically, the instant disclosure relates to computer programs for dynamically generating documents.

BACKGROUND

Conventionally, output documents, such as those produced by a web server, do not include a combination of static and dynamic data. A single script runs on the web server to generate the output document. However, there is a need for a script to combine static and dynamic data.

SUMMARY

According to one embodiment, a method includes executing a dynamic document template. The method also includes generating a script from the dynamic document template. The method further includes creating or appending to an output document based, in part, on the script.

According to another embodiment, a computer program product includes a computer readable medium having code to execute a dynamic document template. The medium also includes code to generate a script from the dynamic document template. The medium further includes code to create an output document based, in part, on the script.

According to yet another embodiment, an apparatus includes a processor and a memory coupled to the processor, in which the processor is configured to execute a dynamic document template. The processor is further configured to generate a script from the dynamic document template. The processor is also configured to create an output document based, in part, on the script.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
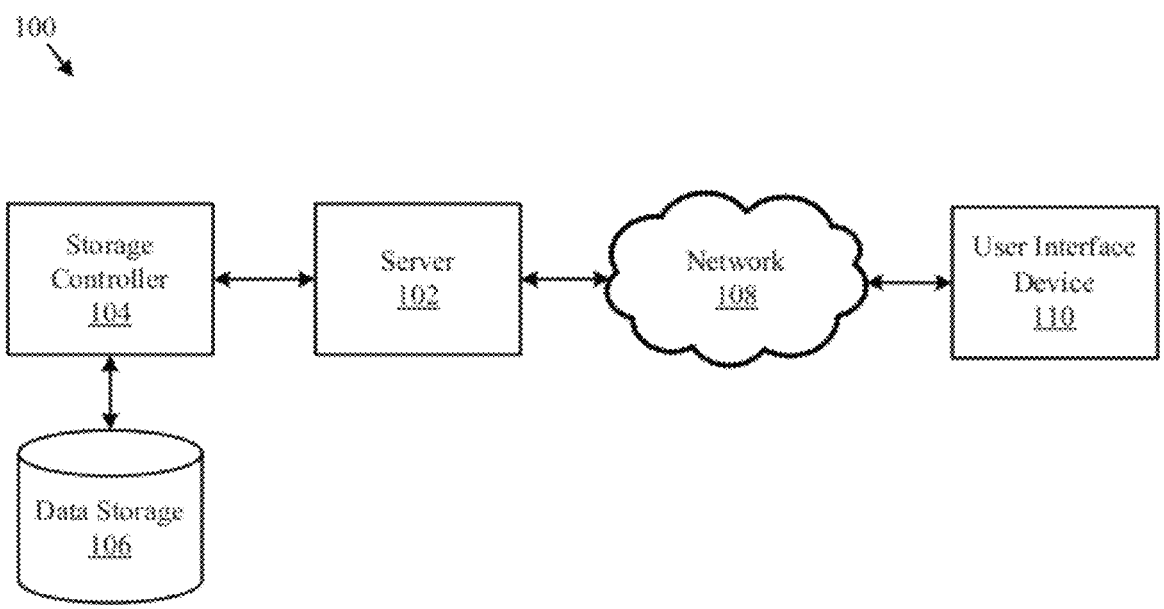
FIG. 1 is a block diagram illustrating an information system according to one embodiment of the disclosure.

FIG. 1 illustrates one embodiment of a system 100 for an information system. The system 100 may include a server 102, a data storage device 106, a network 108, and a user interface device 110. In a further embodiment, the system 100 may include a storage controller 104, or storage server configured to manage data communications between the data storage device 106, and the server 102 or other components in communication with the network 108. In an alternative embodiment, the storage controller 104 may be coupled to the network 108.

In one embodiment, the user interface device 110 is referred to broadly and is intended to encompass a suitable processor-based device such as a desktop computer, a laptop computer, a personal digital assistant (PDA) or table computer, a smartphone or other a mobile communication device or organizer device having access to the network 108. In a further embodiment, the user interface device 110 may access the Internet or other wide area or local area network to access a web application or web service hosted by the server 102 and provide a user interface for enabling a user to enter or receive information.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the server 102 is configured to store data or scripts. Additionally, spreadsheets for calculating recommendations on the server 102 may access data stored in the data storage device 106 via a Storage Area Network (SAN) connection, a LAN, a data bus, or the like. The data storage device 106 may include a hard disk, including hard disks arranged in an Redundant Array of Independent Disks (RAID) array, a tape storage drive comprising a magnetic tape data storage device, an optical storage device, or the like. The data may be arranged in a database and accessible through Structured Query Language (SQL) queries, or other data base query languages or operations.

Figure 2:
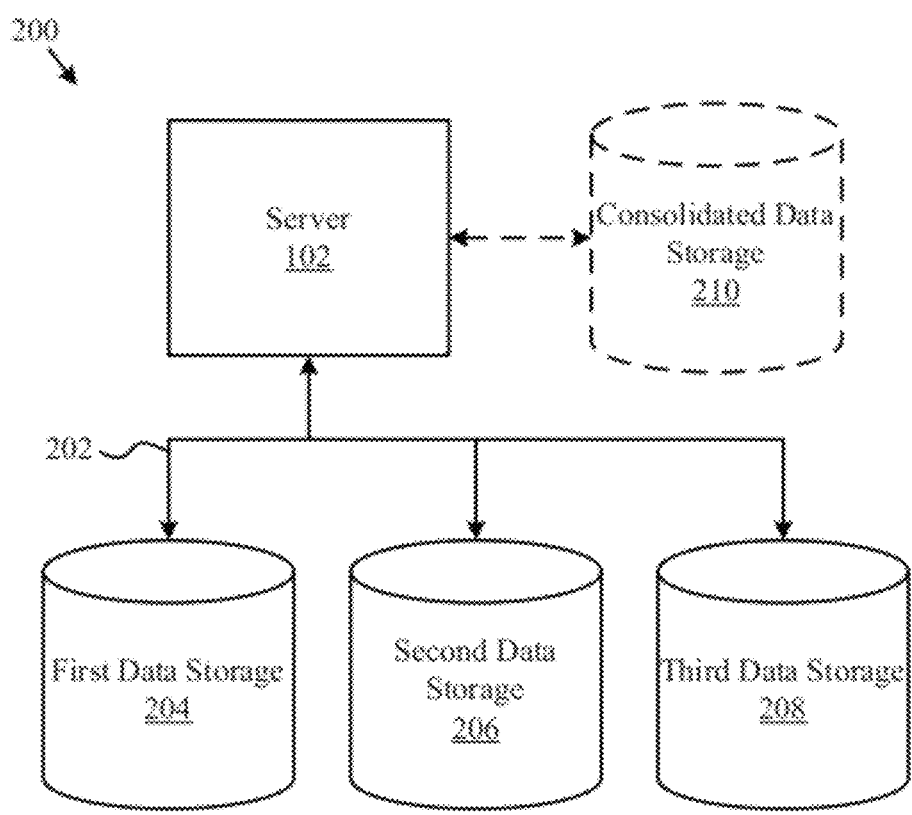
FIG. 2 is block diagram illustrating a data management system configured to store data and/or scripts according to one embodiment of the disclosure.

FIG. 2 illustrates one embodiment of a data management system 200 configured to provide access to data and/or scripts. In one embodiment, the data management system 200 may include a server 102. The server 102 may be coupled to a data-bus 202. In one embodiment, the data management system 200 may also include a first data storage device 204, a second data storage device 206, and/or a third data storage device 208. In further embodiments, the data management system 200 may include additional data storage devices (not shown). In such an embodiment, each data storage device 204, 206, 208 may each host a separate database that may, in conjunction with the other databases, contain redundant data. Alternatively, the storage devices 204, 206, 208 may be arranged in a RAID configuration for storing a database or databases through may contain redundant data.

In one embodiment, the server 102 may submit a query to selected data from the storage devices 204, 206. The server 102 may store consolidated data sets in a consolidated data storage device 210. In such an embodiment, the server 102 may refer back to the consolidated data storage device 210 to obtain a set of data elements and/or scripts. Alternatively, the server 102 may query each of the data storage devices 204, 206, 208 independently or in a distributed query to obtain the set of data elements. In another alternative embodiment, multiple databases may be stored on a single consolidated data storage device 210.

In various embodiments, the server 102 may communicate with the data storage devices 204, 206, 208 over the data-bus 202. The data-bus 202 may comprise a SAN, a LAN, or the like. The communication infrastructure may include Ethernet, Fibre-Chanel Arbitrated Loop (FC-AL), Small Computer System Interface (SCSI), Serial Advanced Technology Attachment (SATA), Advanced Technology Attachment (ATA), and/or other similar data communication schemes associated with data storage and communication. For example, the server 102 may communicate indirectly with the data storage devices 204, 206, 208, 210; the server 102 first communicating with a storage server or the storage controller 104.

The server 102 may include modules for interfacing with the data storage devices 204, 206, 208, 210, interfacing a network 108, interfacing with a user through the user interface device 110, and the like. In a further embodiment, the server 102 may host an engine, application plug-in, or application programming interface (API).

Figure 3:
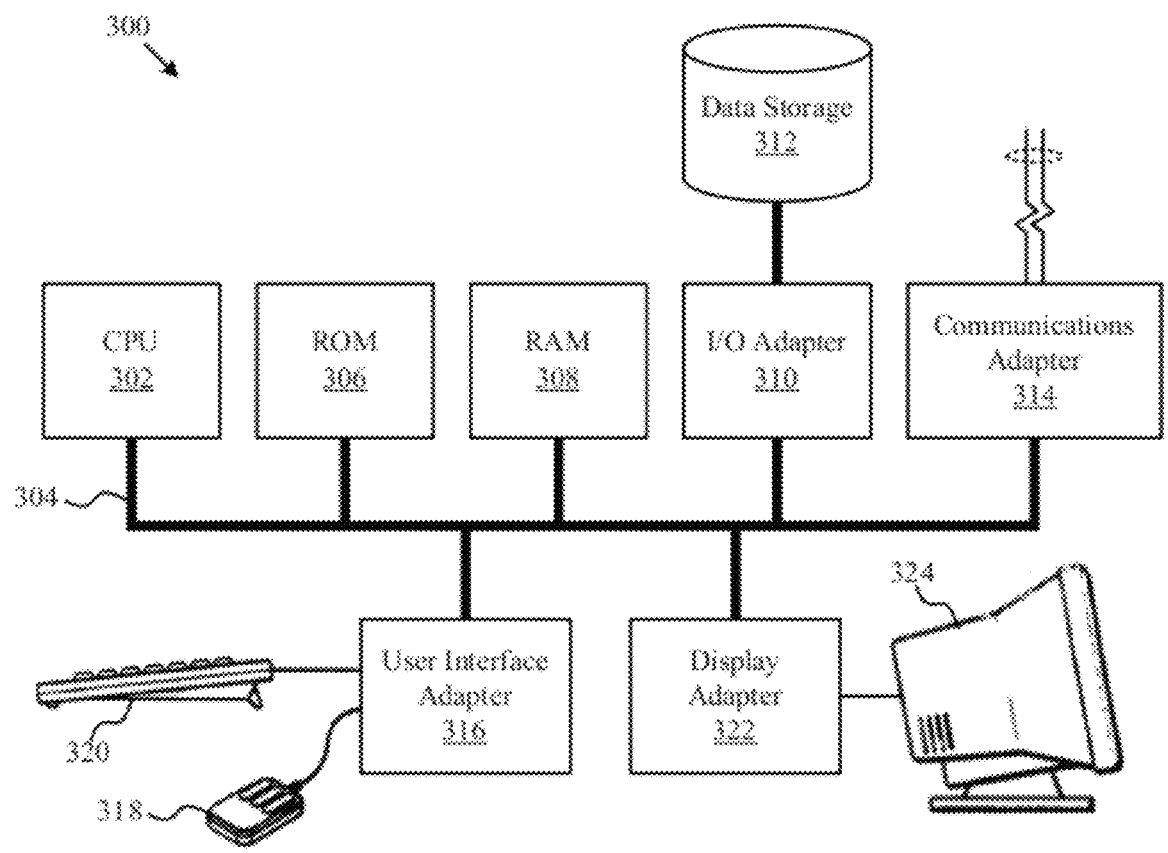
FIG. 3 is a block diagram illustrating a server according to one embodiment of the disclosure.

FIG. 3 illustrates a computer system 300 adapted according to certain embodiments of the server 102 and/or the user interface device 110. The central processing unit ("CPU") 302 is coupled to the system bus 304. The CPU 302 may be a general purpose CPU or microprocessor, graphics processing unit ("GPU"), microcontroller, or the like. The present embodiments are not restricted by the architecture of the CPU 302 so long as the CPU 302, whether directly or indirectly, supports the modules and operations as described herein. The CPU 302 may execute the various logical instructions according to the present embodiments.

The computer system 300 also may include random access memory (RAM) 308, which may be SRAM, DRAM, SDRAM, or the like. The computer system 300 may utilize RAM 308 to store the various data structures used by a software application such as data and/or scripts. The computer system 300 may also include read only memory (ROM) 306 which may be PROM, EPROM, EEPROM, optical storage, or the like. The ROM may store configuration information for booting the computer system 300. The RAM 308 and the ROM 306 hold user and system data.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300. In a further embodiment, the display adapter 322 may display a graphical user interface associated with a software or web-based application. For example, the display adapter 322 may display menus allowing an administrator to input dynamic document templates on the server 102 through the user interface adapter 316.

The I/O adapter 310 may connect one or more storage devices 312, such as one or more of a hard drive, a compact disk (CD) drive, a floppy disk drive, and a tape drive, to the computer system 300. The communications adapter 314 may be adapted to couple the computer system 300 to the network 108, which may be one or more of a LAN, WAN, and/or the Internet. The user interface adapter 316 couples user input devices, such as a keyboard 320 and a pointing device 318, to the computer system 300. The display adapter 322 may be driven by the CPU 302 to control the display on the display device 324.

The applications of the present disclosure are not limited to the architecture of computer system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

Figure 4:
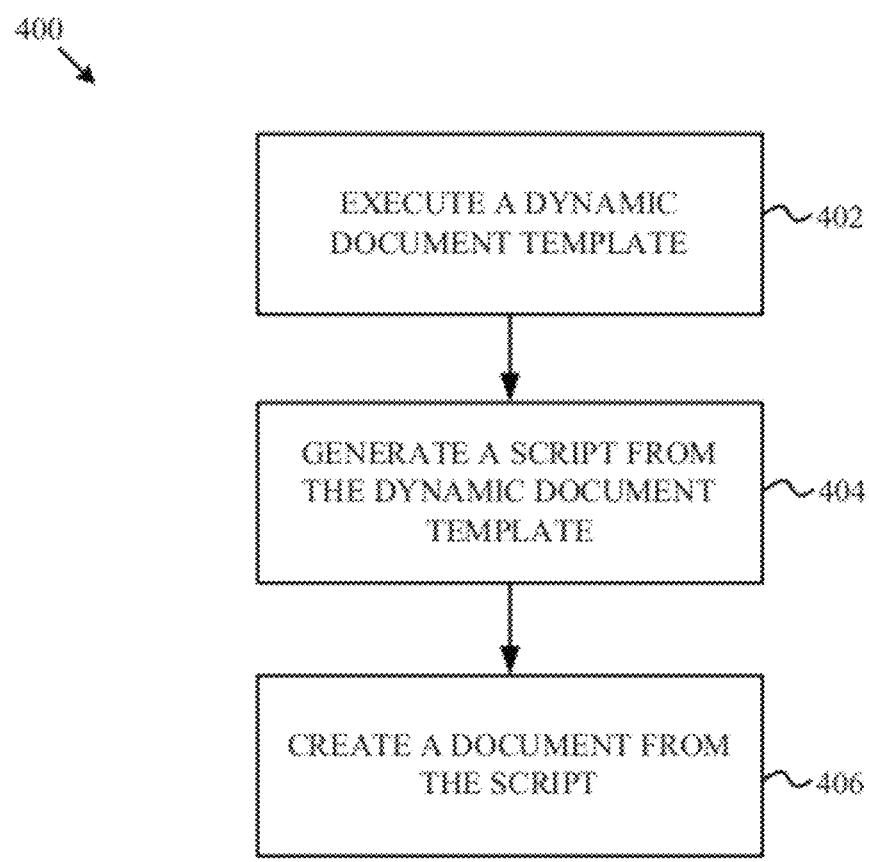
FIG. 4 is a flow chart illustrating an exemplary method for generating a document according to one embodiment of the disclosure.
Figure 5:
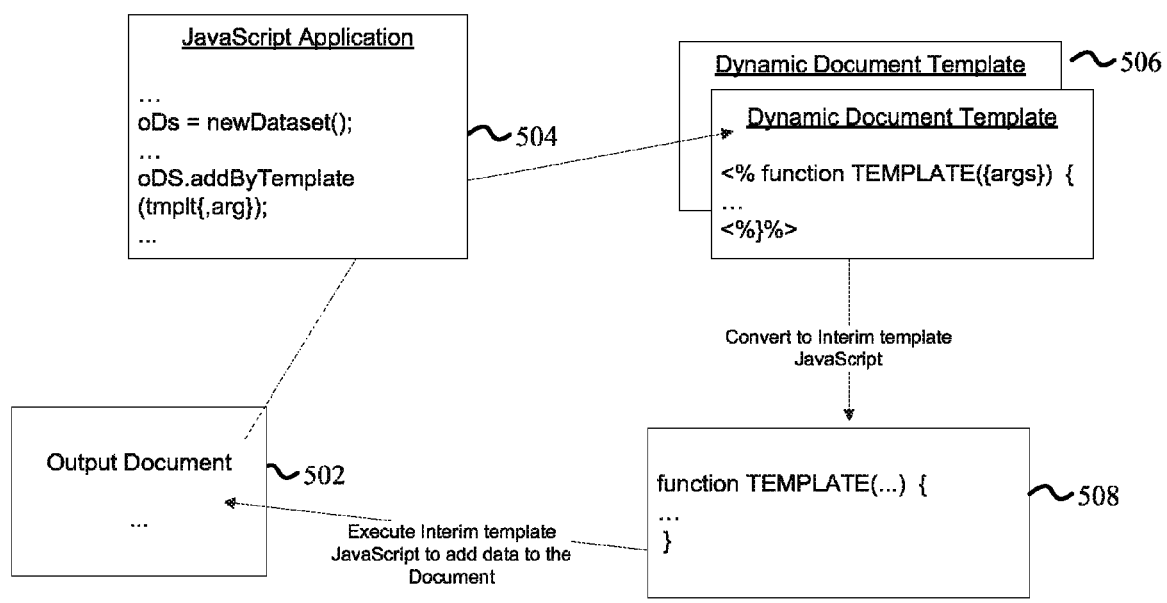
FIG. 5 is a block diagram illustrating a generation of a document according to one embodiment of the disclosure.

FIG. 4 is a flow chart illustrating an exemplary method for generating an output document according to one embodiment of the disclosure. The method of FIG. 4 is described below with reference to FIG. 5. FIG. 5 is a block diagram illustrating a generation of an output document according to one embodiment of the disclosure. A method 400 of FIG. 4 begins at block 402 with executing a dynamic document template. For example, an application 504 of FIG. 5 may call a dynamic document template 506. The application 504 may be, for example, a Business Information Server (BIS) JavaScript. According to one embodiment, the dynamic document template 506 may be executed by calling an addByTemplate( ) function, being a method of a Dataset object, which is to contain the generated document. The addByTemplate( ) function may receive as parameters a container-id identifying the dynamic document template 506. According to one embodiment, the dynamic document template 506 may be created and/or modified in a standard HTML or XML editor.

When calling the dynamic document template 506 the application 504 may pass arguments to the dynamic document template 506. For example, the arguments may be passed in a JavaScript arg[ ] Array object. According to one embodiment, when the addByTemplate( ) function is executed an arg[ ] Array may be passed to the addByTemplate( ) function including information to be passed to the dynamic document template 506. When passing variables, string, number, and Boolean data types may be passed by value to the dynamic document template 506. The application 504 may retrieve modified values from the dynamic document template 506 for variables in the passed arg[ ] Array. Composite objects such as, for example, Dataset objects and Array objects may be passed by-reference to the dynamic document template 506.

According to one embodiment, the addByTemplate( ) function includes a callback function for the calling Dataset object with supporting logic to convert the document template into an interim template JavaScript 508; validate the caller's arguments; load and execute the interim template JavaScript and optional TEMPLATE( ) entry-point function 502; and transfer any non by-reference return TEMPLATE( ) entry point arguments to the callers arg[ ] Array.

The dynamic document template 506 would normally be physically separate from the application 504 such that dynamic document templates may be modified and maintained without impacting the application 504. Additionally, separating the dynamic document template 506 from the application 504 allows debugging action for the addByTemplate( ) function. The dynamic document template 506 may also have access only to variables in its local namespace and variables passed by the application through arguments to the dynamic document template 506. Thus, operations in the dynamic document template 506 have a minimally adverse impact to variables in other portions of the application 504. Furthermore, the separate document template scripts may be called from more than one application program, and may be subject to security controls imposed by the application environment.

According to one embodiment, a dynamic document template 506 may include lines containing either literal data to generate one output document record that is appended to a target dataset that invoked the addByTemplate( ) function or a procedural statement. Lines of the dynamic document template 506 not placed between procedural delimiters may be interpreted literally. Within literal data, assignment delimiters may bracket variables, function calls, or complex expressions whose evaluation directly inserts data into a generated output dataset record.

The method 400 continues to block 404 with generating a script from the dynamic document template. For example, the dynamic document template 506 of FIG. 5 may generate a script 508. The script may be a JavaScript. The dynamic document template 506 may include static data, dynamic data, and/or procedural statements for generating the script 508. The static data, dynamic data, and/or procedural statements may be distinguished by mark-up syntax in the dynamic document template 506. For example, "<%" and "%>" may be used to delimit procedural statements from literal data. Within literal data "<%=" and "%>" may be used to delimit dynamic variable data. A TEMPLATE( ) entry-point function may be included in the dynamic document template 506 for handling arguments passed from the application 504. An example of the dynamic document template 506 is presented as Listing 8 in the Computer Program Listing Appendix.

According to one embodiment, the script 508 is generated temporarily as an interim script, which is executed and the document records generated are appended to an output document 502. After the interim script 508 is generated, a TEMPLATE( ) entry-point function of the script 508 may be executed. After the interim script 508 completes execution, the interim script 508 may be removed from memory.

According to one embodiment, the script 508 is generated from the dynamic document template 506 by interpreting each line in the dynamic document template 506 according to the syntax delimiters to append a new converted line to the interim script 508.

The method of 400 then continues to block 406 by executing the script 508 to generate document records, which may be appended to the output document 502. The document records may be, for example HTML or XML formatted document records. According to one embodiment, the document records are appended to a target dataset object as the script 508 executes such that if the script 508 exits after an error, the target dataset object contains generated document records up to the time the script 508 encounters the error.

According to one embodiment, the script 508 may be executed by a target Dataset object addByTemplate( ) function, which calls an entry-point function in the script 508 such as TEMPLATE( ) with optional passed arguments.

One example of the method 400 of FIG. 4 is illustrated in Listings 1-3 of the Computer Program Listing. Listing 1 of the Computer Program Listing includes an application with a call to the addByTemplate( ) function that executes a dynamic document template. The called dynamic document template is presented in Listing 2 of the Computer Program Listing. The Listing 2 dynamic document template contains procedural statements (e.g., line 1), literal data (e.g., line 2) and dynamic data (e.g., the second from last line has <%=counting(count)%>). Document records created from executing a script generated from the dynamic document template of Listing 2 are shown in Listing 3 assuming the argument passed was a value of '5' for the count 'entry-point' function parameter.

Another example of the method 400 of FIG. 4 is illustrated in Listings 4-6 of the Computer Program Listing. Listing 4 of the Computer Program Listing includes an application with a call to the addByTemplate( ) function that executes a dynamic document template. The called dynamic document template is presented in Listing 5 of the Computer Program Listing. Document records generated from the dynamic document template of Listing 5 are shown in Listing 6.

Yet another example of the method 400 of FIG. 4 is illustrated in Listings 7-9 of the Computer Program Listing. Listing 7 of the Computer Program Listing includes an application with a call to the addByTemplate( ) function that executes a dynamic document template. The called dynamic document template is presented in Listing 8 of the Computer Program Listing. Document records generated from the dynamic document template of Listing 8 are shown in Listing 9.

A further example of the method 400 of FIG. 4 is illustrated in Listings 10-12 of the Computer Program Listing. Listing 10 of the Computer Program Listing includes an application with a call to the addByTemplate( ) function that executes a dynamic document template. The called dynamic document template is presented in Listing 11 of the Computer Program Listing. Document records generated from the dynamic document template of Listing 11 are shown in Listing 12.

Separating static data and dynamic data with a dynamic document template as described above improves usability of an application accessing the dynamic document template. The application may call the dynamic document template without having data not passed to the dynamic document template inadvertently altered. Additionally, the inclusion of dynamic document templates allows easy modification of an application accessing the dynamic document templates. For example, a user or administrator of an application may replace a first set of dynamic document templates with a second set of dynamic document templates without altering code in the application or operation of the application.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

COMPUTER PROGRAM LISTING APPENDIX

LISTING 1

```
function COUNTEM( )
{
try {
// Call addByTemplate( ) to produce the output
var ds = new Dataset( );
ds.create("A0");
var args = new Array(5);            //pass count
ds.addByTemplate("2A0", args);      //call document template
ReturnDataset(ds);
} catch (e) {
throw(e);
}
}
```

LISTING 2

```
<%function TEMPLATE(count) {%>
I say quite literally: "You can't have your cake and eat it too."
<%function counting(c) {
var s = "";
for (var i = 1; i <= c; i++) {
if (s.length > 0) { s += ", "; } //comma separated
s += i;
}
return s;
}%>
Counting: <%=counting(count)%>
<%} // end of the document template. %>
```

LISTING 3

I say quite literally: "You can't have your cake and eat it too."
Counting: 1, 2, 3, 4, 5

LISTING 4

```
function OA2( )
{
try {
// Computing Percentages of Grand Totals
var ds = new Dataset( );
ds.open("5G0");
var tal = new TallyParams( );
tal.key[1].columnInfo("Location");
tal.opSubtotal("Down", asPercent, −1);
tal.opCountEntry("Cost", asCumulativePercent, 1);
var ds1 = ds.tally(tal);            //perform tally analysis
ds.close( );
// Call addByTemplate( ) to produce the output
ds.create("A0");
var args = new Array(ds1);          //pass tally Dataset
ds.addByTemplate("3A0", args);      //call document template
ReturnDataset(ds);
} catch (e) {
throw(e);
}
}
```

LISTING 5

```
<%function TEMPLATE(ds)
{%>
<%=Date( )%>
Here are the down time percentages:
<%
var city; var pct = 100;
//Display each city and its down time percentage.
ds.currentRecord = 0;
while (ds.nextRecord( )) {
%>
<%=ds.column[1].value%>    <%=ds.column[2].value%>%
<%
//Capture the city with the lowest percentage.
if (Number(ds.column[2].value) < pct) {
pct = Number(ds.column[2].value);
city = ds.column[1].value.replace(/\s*$/,"");
}
```

-continued

```
}%>
<%=city%> had the lowest down time (<%=pct%>%).
<%} // end of the document template. %>
LISTING 6
```

```
Tue Oct 25 09:12:23 2005
Here are the down time percentages:
BOSTON               48.6%
CHICAGO              45.8%
NEW YORK              5.6%
NEW YORK had the lowest down time (5.6%).
LISTING 7
```

```
//Variables that are used in the document template
var oDs_desc = new Dataset( );
oDs_desc.open("19A0");                      //dataset with short desc
var w = new Array( );
w["ALinkClr"] = "alink=#FFFFFF";            //ALinkClr
w["DocBgClr"] = "bgcolor=#FF0000";          //DocBgClr
w["LinkClr"] = "link=#0033FF";              //LinkClr
w["VLinkClr"] = "vlink=#0033FF";            //VLinkClr
w["GURL"] = "http://abc/ICE/default.asp?";  //GURL
w["GCatKwd"] = "Category=";                 //GCatKwd
w["GSysCat"] = "ICEAdm";                    //GSysCat
w["GSvcKwd"] = "&Service=";                 //GSvcKwd
var args = new Array(w, oDs_desc);          //w, ds_desc
oDs.addByTemplate("4A0", args);             //call document template
LISTING 8
```

```
<%function TEMPLATE(w, ds_desc) {%>
<HTML>
<HEAD>
<TITLE>Simple Information Page Example</TITLE>
</HEAD>
<!--Next line defines body properties whose values are function parameters-->
<BODY <%=w.DocBgClr%> <%=w.LinkClr%> <%=w.ALinkClr%> <%=w.VLinkClr%>>
<TABLE BORDER=0 WIDTH="100%">
<TR>
<TD><H1>Simple Information Page Example</H1></TR>
<TD ALIGN="RIGHT">
<A HREF="http://www.sampleURL.com"><IMG
SRC="<%=w.GURL+w.GCatKwd+w.GSysCat+w.GSvcKwd%>BISPower-Img"
border="0"
ALT="Click here for more information"></A>
</TD>
</TR>
</TABLE><HR>
<%//Read the short description into the page
while (ds_desc.nextRecord( )) {%>
<%=ds_desc.column[1].value%>
<%}%>
</HR>
</BODY>
</HTML>
<%} // end of the document template. %>
LISTING 9
```

```
<HTML>
<HEAD>
<TITLE>Simple Information Page Example</TITLE>
</HEAD>
<!--Next line defines body properties whose values are function parameters-->
<BODY bgcolor=#FF0000 link=#0033FF alink=#FFFFFF vlink=#0033FF>
<TABLE BORDER=0 WIDTH="100%">
<TR>
<TD><H1>Simple Information Page Example</H1></TR>
<TD ALIGN="RIGHT">
<A HREF="http://www.sampleURL.com"><IMG
SRC="http://abc/ICE/default.asp?Category=ICEAdm&Service=BISPower-Img"
border="0"
ALT="Click here for more information"></A>
</TD>
</TR>
</TABLE><HR>
This is just a short free-form report.
Now is the time for all good men to come to the aid of their party.
The end.
```

```
</HR>
</BODY>
</HTML>
LISTING 10 function SPECIALCHARS( )
{
try {
// Generating special characters
// Call addByTemplate( ) to produce the output
var ds = new Dataset( );
ds.create("A0");
ds.addByTemplate("5A0");    //call document template
ReturnDataset(ds);
} catch (e) {
throw(e);
}
}
LISTING 11

<%function TEMPLATE( ) {%>
To include document template delimiters in output records.
*Start JavaScript syntax:
Template code <%="<\%='<\\%'%\>'"%>    generates output <%='<\%'%>
*Start JavaScript insert syntax:
Template code <%="<\%='<\\%='%\>'"%> generates output <%='<\%='%>
*End JavaScript or end JavaScript insert syntax:
Template code <%="<\%='%\\>'%\>'"%>    generates output <%='%\>'%>
<%} // end of the template. %>
LISTING 12

To include document template delimiters in output records.
*Start JavaScript syntax:
Template code <%='<\%'%>    generates output <%
*Start JavaScript insert syntax:
Template code <%='<\%='%> generates output <%=
*End JavaScript or end JavaScript insert syntax:
Template code <%='%\>'%>    generates output %>
```

What is claimed is:

1. A computer implemented method, comprising:
   executing a dynamic document template having access only to variables in its local namespace and variables passed by an application through arguments to the dynamic document template, wherein the dynamic document template is physically separate from the application, in which executing dynamic document template comprises calling the separate dynamic document template scripts which comprise the dynamic document template from more than one application program, in which calling the dynamic document template comprises generating an interim script, and in which the method further comprises the step of deleting the interim script after generating the document;
   generating a script from the dynamic document template; and
   creating a document based, in part, on the script by executing procedural statements of the script to generate document records,
   wherein the document comprises document records without the procedural statements.

2. The method of claim 1, further comprising passing arguments to the dynamic document template before generating the script from the dynamic document template.

3. The method of claim 1, in which the dynamic document template is called from a Business Information Server (BIS) script.

4. The method of claim 1, further comprising appending the document to a Dataset object.

5. The method of claim 3, further comprising compiling the interim script alter generating the script.

6. The method of claim 1, in which executing the dynamic document template comprises distinguishing between static data, dynamic data, and procedural statements.

7. The method of claim 6, in which creating the document comprises customizing the document based, in part, on the procedural statements and arguments passed from a calling application.

8. The method of claim 6, in which distinguishing comprises identifying mark-up syntax distinguishing between the static data, dynamic data, and procedural statements.

9. The method of claim 1, further comprising executing a second dynamic document template.

10. A computer program product, comprising:
    a non-transitoty computer readable medium comprising:
    code to execute a dynamic document template having access only to variables in its local namespace and variables passed by an application through arguments to the dynamic document template, wherein the dynamic document template is physically separate from the application, in which the code to execute the dynamic document template comprises code to call separate dynamic document template scripts which comprise the dynamic document template from more than one application program, in which the code to call the dynamic document template comprises code to generate an interim script, and further comprises code to delete the interim script after the document is generated;
    code to generate a script from the dynamic document template; and
    code to create a document based, in part, on the script by executing procedural statements of the script to generate document records, wherein the document comprises document records without the procedural statements.

11. The computer program product of claim 10, in which the medium further comprises code to append the document to a dataset object.

12. The computer program product of claim 10, in which the medium further comprises code to compile the script after generating the script.

13. The computer program product of claim 10, in which the medium further comprises code to distinguish between static data, dynamic data, and procedural statements in the dynamic document template.

14. The computer program product of claim 13, in which the medium further comprises code to interpret mark-up syntax in the dynamic document template to distinguish between static data, dynamic data, and procedural statements in the dynamic document template.

15. An apparatus, comprising:
   at least one processor and a memory coupled to the at least one processor, in which the at least one processor is configured:
   to execute a dynamic document template having access only to variables in its local namespace and variables passed by an application through arguments to the dynamic document template, wherein the dynamic document template is physically separate from the application, in which the step to execute the dynamic document template comprises the step to call separate dynamic document template scripts which comprise the dynamic document template from more than one application program, in which the step to call the dynamic document template comprises the step to generate an interim script, and in which the method further comprises code to delete the interim script after the document is generated;
   to generate a script from the dynamic document template; and
   to create a document based, in part, on the script by executing procedural statements of the script to generate document records, wherein the document comprises document records without the procedural statements.

16. The apparatus of claim 15, in which the at least one processor is further configured to append the document to a Dataset object.

17. The apparatus of claim 15, in which the at least one processor is further configured to compile the script after generating the script.

18. The apparatus of claim 15, in which the at least one processor is further configured to interpret mark-up syntax in the dynamic document template to distinguish between static data, dynamic data, and procedural statements in the dynamic document template.

* * * * *